United States Patent [19]

Tsukimi et al.

[11] Patent Number: 5,554,323
[45] Date of Patent: Sep. 10, 1996

[54] PROCESS FOR PRODUCING MICROCAPSULES

[75] Inventors: Yoshihiro Tsukimi; Takayuki Matsumoto; Hideo Nagano, all of Shizuoka, Japan

[73] Assignee: Fuji Photo Film Co., Ltd., Kanagawa, Japan

[21] Appl. No.: 145,626

[22] Filed: Nov. 4, 1993

[30] Foreign Application Priority Data

Nov. 5, 1992 [JP] Japan ................................. 4-319305

[51] Int. Cl.$^6$ .................................................. B01J 13/16
[52] U.S. Cl. ......................... 264/4.7; 252/314; 264/4.1
[58] Field of Search ............................ 252/314; 264/4.1, 264/4.7

[56] References Cited

U.S. PATENT DOCUMENTS

| | | | |
|---|---|---|---|
| 3,016,308 | 1/1962 | Macaulay | 264/4.6 X |
| 3,469,439 | 9/1969 | Roberts | 73/88 |
| 4,119,565 | 10/1978 | Baatz et al. | 264/4.7 |
| 4,132,112 | 1/1979 | Hosoi et al. | 73/141 R |
| 4,140,516 | 2/1979 | Scher | 264/4.7 X |
| 4,285,720 | 8/1981 | Scher | 264/4.7 X |
| 4,349,455 | 9/1982 | Yamamura et al. | 252/314 X |
| 4,539,139 | 9/1985 | Ichikawa et al. | 252/314 |
| 4,915,947 | 4/1990 | Thenard et al. | 264/4.7 X |
| 5,164,126 | 11/1992 | Kalishek et al. | 264/4.7 |
| 5,370,824 | 12/1994 | Nagano et al. | 252/314 |

FOREIGN PATENT DOCUMENTS

| | | |
|---|---|---|
| 0486974 | 5/1992 | European Pat. Off. . |
| 3249001 | 9/1969 | Germany . |
| 54-78186 | 6/1979 | Japan . |

*Primary Examiner*—Richard D. Lovering
*Attorney, Agent, or Firm*—Sughrue, Mion, Zinn, Macpeak & Seas

[57] ABSTRACT

A process for producing microcapsules that have a sufficiently broad particle size distribution to be suitable for use in a pressure measuring films, which process is improved in that it eliminates the need to perform blending and filtering operations while reducing the possible loss in capsule solutions or films or operating efficiency of the capsule applicator. A disperse phase is poured into a disperse medium as the latter is stirred in a preliminary emulsification tank, thereby forming a primary emulsion. The primary emulsion is forced into cylindrical continuous emulsification equipment by means of a metering pump. An emulsion having a broad particle size distribution is produced by lowering stepwise the rotational speed of the inner cylinder of the continuous emulsification equipment in accordance with the following schedule: 3 min and 15 sec at 2900 rpm, 4 min and 15 sec at 2700 rpm, 4 min and 15 sec at 2300 rpm, and 3 min and 15 sec at 2100 rpm. Subsequently, water and a 50% aqueous solution of sodium hydroxide are added to the emulsion in an encapsulation tank 4, where an encapsulation reaction is performed for 3 hours at 72° C. with a stirrer being revolved, thereby producing a capsule solution.

5 Claims, 2 Drawing Sheets

PROCESS FOR PRODUCING MICROCAPSULES

BACKGROUND OF THE INVENTION

The present invention relates to a process for producing microcapsules, more particularly, to a process for producing mlcrocapsules that have a sufficiently broad particle size distribution as to be suitable for use in a pressure measuring film.

One of the conditions that should preferably be satisfied by microcapsules suitable for use in a pressure measuring film is that they have a linear relationship between pressure and color density in order to provide pressure measurements of high precision. In order to provide a linear relationship between pressure and color density, the capsules must have a broad particle size distribution.

Conventionally, microcapsules prepared by a batch process of emulsification using a paddle blade or a dissolver blade are provided with a pressure-density curve of good linearity by blending two or more microcapsule solutions that have been produced by different methods (see U.S. Pat. No. 4,132,112) or by coating multiple layers of two or more microcapsules having different breaking strengths (see Unexamined Published Japanese Patent Application No. 78186/1979).

However, the microcapsules prepared by a batch process of emulsification using a paddle blade or a dissolver blade have only poor reproducibility of particle size distribution and suffer from the following disadvantages:

(1) preliminary coating and evaluation procedures are necessary for checking the performance of capsules, and this causes a loss in the capsule solution or film, potentially leading to a lower operational output;

(2) preparing and blending two or more microcapsule solutions is a great operating load; and (3) the batch process of emulsification using a paddle blade or a dissolver blade produces not only coarse particles which can cause "color peppers" (spotty color formation) but also minute particles which in no way participate in color formation.

Therefore, in order to produce a product that is useful as a pressure measuring film, a filtering operation is necessary for rejecting any coarse particles present, but this is another factor that increases the operating load.

The present invention has been accomplished under these circumstances, and has an object the provision of a process for producing microcapsules that not only eliminates the possible loss of capsule solutions or films or operating efficiency of the coating applicator due to a process of checking the performance of capsules, but also obviates the need to perform blending and filtering operations.

SUMMARY OF THE INVENTION

The above and other objects of the present invention can be attained by a process for producing microcapsules using continuous emulsification equipment, wherein the rotational speed of the continuous emulsification equipment is varied either continuously or stepwise so as to prepare an emulsion having an average particle size of 3–30 μm with a broad particle size distribution, and wherein synthetic high polymer based wall membranes serving as shells in the emulsion are formed in encapsulation equipment.

The emulsion to be prepared in the present invention is not limited to any particular type. However, in the case of microcapsules for use in a pressure measuring film, the preferred emulsion may be prepared by the following process: an oily solution having a color forming agent dissolved therein is prepared, then a polyisocyanate and an amine are added to the oily solution in suitable amounts, and thereafter the oily solution is mixed with an emulsifier containing aqueous high polymer solution and the mixture is subjected to emulsification and dispersion.

The "continuous emulsification equipment" used in the description of the invention is described in commonly assigned European Patent Publication No. 486,974-A1; the equipment includes an outer cylinder that contains in it a coaxially rotating inner cylinder with a certain clearance from the outer cylinder that is uniform along the length of the inner cylinder.

This equipment offers the advantage that the emulsion being prepared will not be short-cut but is given a uniform shearing force for a uniform period of time to insure that fine particles will positively be formed without producing unduly small or (minute) coarse particles, thus yielding an emulsified product having a very uniform particle size distribution. If the rotational speed of the dual cylindrical continuous emulsification equipment is selected the range of 1,000–5,000 rpm, one can prepare an emulsified product that has different particle sizes but a uniform particle size distribution.

In accordance with the present invention, the rotational speed of the dual cylindrical continuous emulsification equipment is varied either continuously or stepwise, which means that by varying the rotational speed of the equipment, a change in particle size is effected to prepare an emulsion that has an average particle size of 3–30 μm with a broad particle size distribution. The manner in which the rotational speed of the equipment is varied may be continuous or stepwise; the change in the rotational speed may be from the high to the low side or vice versa; alternatively, a two-way change may be repeated.

The dual cylindrical continuous emulsification equipment is supplied with a mixture of the oily solution and the aqueous high polymer solution. If desired, the mixture to be supplied may be subjected to preliminary emulsification under certain stirring conditions until the average particle size is within the range of about 20–60 μm.

The encapsulation equipment to be used in the process of the present invention is in no way limited, and any known type that is commonly used will suffice. The equipment may be operated on a continuous or batch basis.

DESCRIPTION OF THE PREFERRED EMBODIMENTS

Example 1

A disperse phase was prepared by the following method. A color forming agent (115 parts by weight) was dissolved in 600 parts by weight of diarylethane. To the resulting oily solution, 160 parts by weight of isoparaffin was added; also added were 4 parts by weight of an ethylenediamine propylene oxide adduct ("QUADROL", a tradename of Asahi Denka Kogyo K. K.) dissolved in 10 parts by weight of methylethylketone and 40 parts by weight of a trimethylolpropane adduct of tolylene diisocyanate ("BURNOCK.D-750", a tradename of Dainippon Ink & Chemicals, Inc.) dissolved in 25 parts by weight of methylethylketone.

In a separate step, 69 parts by weight of polyvinyl alcohol was dissolved in 1319 parts by weight of water to prepare a disperse medium.

Figure 1:
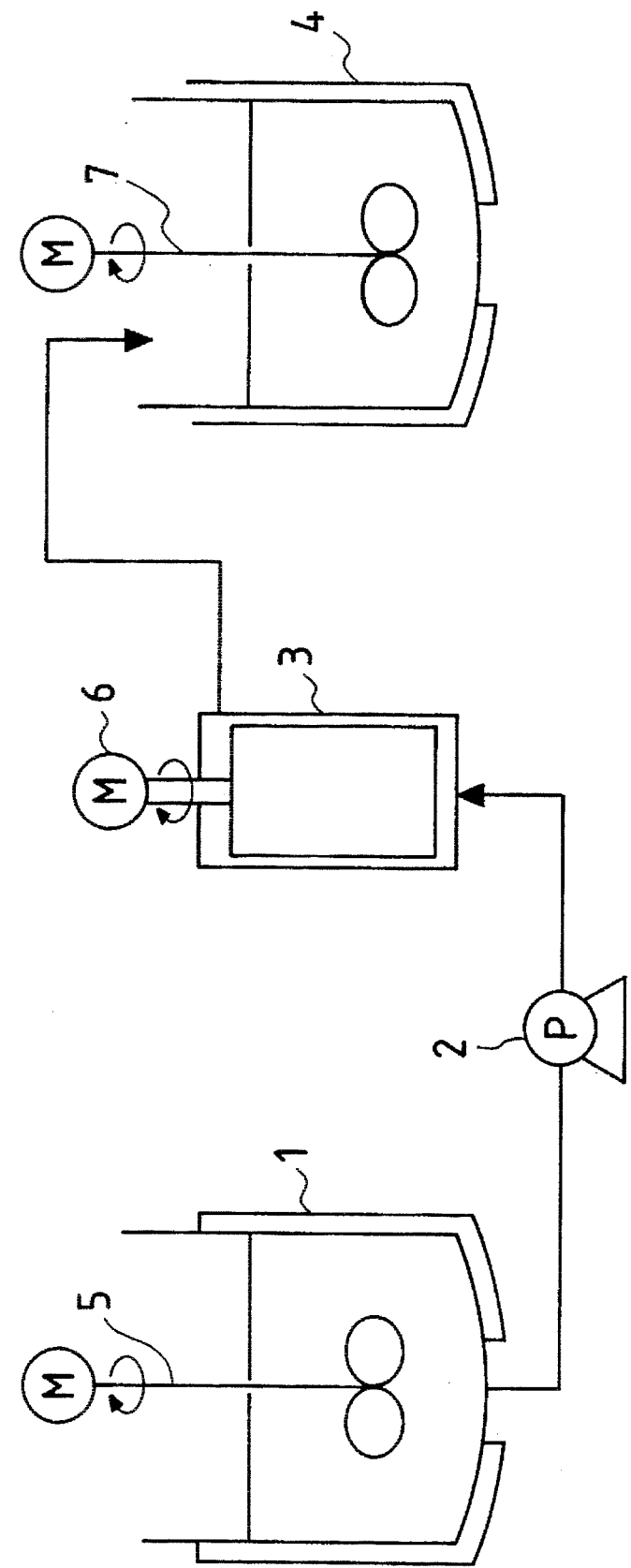
FIG. 1 is a flowsheet for an example of equipment for implementing the process of the present invention for producing microcapsules.

In the next step, the disperse phase was poured into the disperse medium in a preliminary emulsification tank 1 (see FIG. 1) as it was stirred with a stirrer 5 at a rotational speed of 650 rpm, whereby a primary emulsion having an average particle size of 40 μm was formed.

The primary emulsion was forced with a metering pump 2 into dual cylindrical continuous emulsification equipment at a flow rate of 1 l/min. The cylindrical emulsification equipment 3 consisted of a stationary outer cylinder and an inner cylinder that was rotatable by a variable speed motor 6. An emulsion having a broad particle size distribution was prepared by reducing the rotational speed of the inner cylinder in accordance with the following schedule: 3 min and 15 sec at 2900 rpm; 4 min and 15 sec at 2700 rpm; 4 min and 15 sec at 2300 rpm; and 3 min and 15 sec at 2100 rpm.

Subsequently, 1289 parts by weight of the emulsion was fed into an encapsulation tank 4, which was also charged with 2830 parts by weight of water and 10 parts by weight of a 50% aqueous solution of sodium hydroxide. A stirrer 7 in the tank 4 was rotated to initiate an encapsulation reaction, which was continued for 3 hours at 72° C. to produce a capsule solution.

Figure 2A:
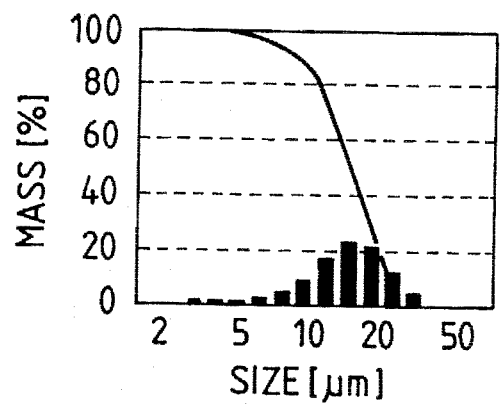
FIG. 2A shows the mass-based size distribution of a capsule solution prepared in accordance with an Example 1 by the process of the present invention for producing microcapsules.
Figure 2B:
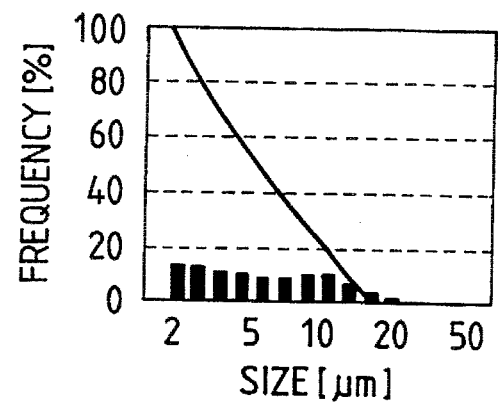
FIG. 2B shows the number-based size distribution, i.e. size-frequency distribution of the same capsule solution.

The mass-based and number-based size distributions of the capsule solution were measured with Coulter Multisizer II (product of Coulter Electronics, Inc.), and the results are shown in FIGS. 2A and 2B, respectively. The solid curves in these figures show the cumulative distributions.

The capsule solution was coated on a polyethylene terephthalate film and dried to prepare a color forming sheet.

A color developing sheet was superposed on the color forming sheet, and pressures in the range of 5–25 kg/cm$^2$ were applied in increments of 2.5 kg/cm$^2$, thereby producing color. The resulting color density was measured with a densitometer to construct a pressure-density curve, which is identified by curve a in FIG. 3.

Comparative Example 1

A disperse phase and disperse medium were prepared is the same manner as in Example 1. The disperse phase was poured into the disperse medium as the latter was stirred with a paddle blade at 535 rpm. By a 4 minute emulsification, an emulsion having an average particle size of 20 μm was prepared (the method was batchwise emulsification).

In a similar manner, emulsification was conducted for 4 minutes with the rotational speed of the stirrer being varied at 650 rpm, 670 rpm and 770 rpm to prepare three additional emulsions which had average particle sizes of 18 μm, 13 μm and 12 μm, respectively.

The four emulsions were blended in a ratio of 2:1:2:1, and the mixture was subjected to an encapsulation reaction in the same equipment as used in Example 1, thereby producing a capsule solution.

Figure 4A:
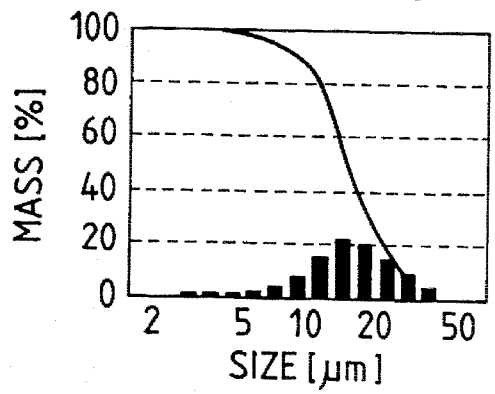
FIG. 4A shows the mass-based size distribution of a capsule solution prepared by a conventional process for the production of microcapsules.
Figure 4B:
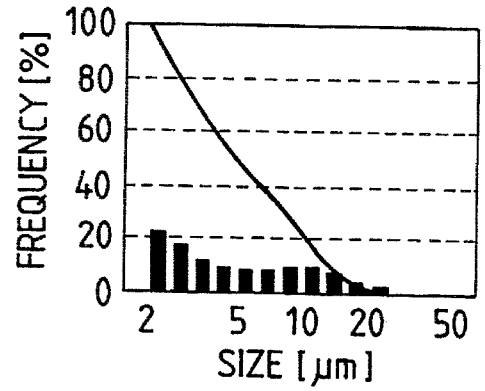
FIG. 4B shows the number-based size distribution, i.e. size-frequency distribution of the same capsule solution.

The mass-based and number-based size distributions of the capsule solution were measured with a Coulter Multisizer II (product of Coulter Electronics, Inc.), and the results are shown in FIGS. 4A and 4B, respectively. The solid curves in these figures show the cumulative distributions.

The capsule solution was coated on a polyethylene terephthalate film and dried to prepare a color forming sheet.

A color developing sheet was superposed on the color forming sheet, and a pressure-density curve was constructed as in Example 1. The constructed curve is identified by curve b in FIG. 3.

Comparison was made between Example 1 and Comparative Example 1 in which a pressure measuring film was produced by a conventional method.

It should first be noted that by comparing the particle size distribution diagram for the capsule solution prepared in Example 1 (see FIG. 2B) with the diagram for the capsule solution prepared in Comparative Example 1 (see FIG. 4B), one can see that the capsule solution prepared in Example 1 had smaller contents of both coarse and minute particles.

Figure 3:
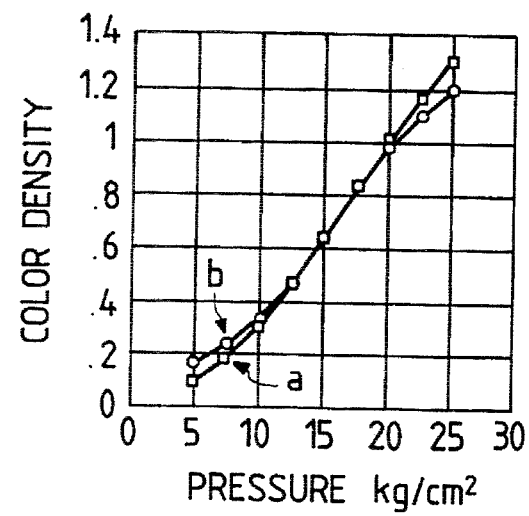
FIG. 3 is a diagram comparing the pressure-density curve (a) of a film coated with a capsule solution prepared in Example 1 by the process of the present invention for producing microcapsules and a pressure-density curve (b) of a film coated with a capsule solution prepared in Comparative Example 1.

Comparison was also made between the pressure-density curve for Example 1 and that for Comparative Example 1 (see FIG. 3). Obviously, both capsule solutions had broad particle size distributions, and hence each pressure-density curve was linear. However, upon closer inspection, curve a (Example 1) was found to have better linearity than curve b (Comparative Example 1) since the capsule solution prepared in Example 1, which had smaller contents of both minute particles (which did not participate in color formation) and coarse particles (which would form color at low pressures) had the lower minimum color density (at 5 kg/cm$^2$) but the higher maximum color density (at 25 kg/cm$^2$).

The foregoing data show that by varying the rotational speed of the continuous emulsifier stepwise, a microcapsule solution that contained minute and coarse particles in smaller amounts than would occur in the prior art method could be produced, and the solution had both a pressure-density/relationship of better linearity and a broad particle size distribution could be produced without performing a blending operation.

In accordance with the present invention, a microcapsule solution that had smaller contents of minute and coarse particles and which exhibited a pressure-density relationship of better linearity with a broad particle size distribution could be produced without performing a blending operation.

The smaller contents of minute and coarse particles contributed to the improved quality of pressure measuring films, whereas the pressure-density relationship of better linearity helped improve the precision of measurements.

As a further advantage, the elimination of the need to perform a blending operation contributed to a shorter time of emulsion preparation and a lighter operating load.

What is claimed is:

1. A process for producing microcapsules using continuous emulsification equipment, comprising the steps of: pouring a disperse phase into a disperse medium in a preliminary emulsification tank medium while stirring said disperse medium to thereby form a primary emulsion; transferring said primary emulsion into cylindrical continuous emulsification equipment having a rotatable inner cylinder; rotating said inner cylinder and subsequently stepwise lowering the rotational speed of said inner cylinder in accordance with a predetermined schedule to produce a broad particle size distribution; subsequently adding water and an aqueous solution of sodium hydroxide to said emulsion in an encapsulation tank; and revolving a stirrer in said encapsulation tank while performing an encapsulation reaction in said encapsulation tank to thereby produce a capsule solution, wherein synthetic high polymer based wall membranes serving as shells in said emulsion are formed in said encapsulation tank.

2. The process for producing microcapsules of claim 1, wherein said predetermined schedule is substantially: 3 min and 15 sec at 2900 rpm, 4 min and 15 sec at 2700 rpm, 4 min and 15 sec at 2300 rpm, and 3 min and 15 sec at 2100 rpm.

3. The process for producing microcapsules of claim 1, wherein said encapsulation reaction is performed for approximately 3 hours at a temperature of approximately 72° C.

4. The process for producing microcapsules of claim 1, wherein said particle size distribution is 3–30 μm.

5. The process for producing microcapsules of claim 1, further comprising the step of preliminarily emulsifying said disperse phase and disperse medium by stirring to yield an average particle size in a range of about 20–60 μm.

* * * * *